(12) United States Patent
Wimmer

(10) Patent No.: US 10,714,883 B2
(45) Date of Patent: Jul. 14, 2020

(54) ELECTRICAL LINE ARRANGEMENT WITH FLAT CONDUCTOR RAIL AND TOLERANCE COMPENSATION

(71) Applicant: Lisa Draexlmaier GmbH, Vilsbiburg (DE)

(72) Inventor: Wolfgang Wimmer, Salching (DE)

(73) Assignee: LISA DRAEXLMAIER GmbH, Vilsbiburg (DE)

( * ) Notice: Subject to any disclaimer, the term of this patent is extended or adjusted under 35 U.S.C. 154(b) by 0 days.

(21) Appl. No.: 16/464,589

(22) PCT Filed: Nov. 29, 2017

(86) PCT No.: PCT/EP2017/080741
§ 371 (c)(1),
(2) Date: May 28, 2019

(87) PCT Pub. No.: WO2018/099934
PCT Pub. Date: Jun. 7, 2018

(65) Prior Publication Data
US 2020/0127426 A1  Apr. 23, 2020

(30) Foreign Application Priority Data
Nov. 29, 2016  (DE) .................. 10 2016 123 036

(51) Int. Cl.
*H01R 25/14* (2006.01)
*H01R 9/26* (2006.01)
(Continued)

(52) U.S. Cl.
CPC ......... *H01R 25/142* (2013.01); *H01R 9/2608* (2013.01); *H01R 13/73* (2013.01);
(Continued)

(58) Field of Classification Search
CPC .... H01R 25/142; H01R 9/2608; H01R 13/73; H01R 2201/26; H01R 9/2483; H01R 9/2675
(Continued)

(56) References Cited

U.S. PATENT DOCUMENTS 5,975,933 A * 11/1999 Yamaguchi ............. B60R 15/02
439/247
6,528,900 B1 * 3/2003 Serizawa ............ B60R 16/0207
307/10.1
(Continued)

FOREIGN PATENT DOCUMENTS

DE       12 32 237 B       1/1967
DE       195 17 396 A1    11/1996
(Continued)

OTHER PUBLICATIONS

Office Action in German Application No. 10 2016 123 036.7, dated Jan. 14, 2019, 10 pages.
(Continued)

*Primary Examiner* — Edwin A. Leon
(74) *Attorney, Agent, or Firm* — Jacob Eisenberg

(57) ABSTRACT

An electrical line arrangement for a vehicle including a dimensionally stable flat conductor rail and a contact part housing fitted on the flat conductor rail such that it at least partially engages around the flat conductor rail. A contact part which makes contact with the flat conductor rail can be accommodated or is accommodated in the contact part housing. The line arrangement includes a mounting rail having a mounting flange for connection to the vehicle and a first connecting flange through which the contact part housing is held on the mounting rail in an interlocking manner in such a way that enables movement in a translatory manner along the mounting rail.

13 Claims, 2 Drawing Sheets

(51) Int. Cl.
    *H01R 13/73*     (2006.01)
    *H02G 3/32*      (2006.01)
    *H02G 11/00*     (2006.01)
    *B60R 16/02*     (2006.01)

(52) U.S. Cl.
    CPC ............... *H02G 3/32* (2013.01); *H02G 11/00* (2013.01); *B60R 16/0207* (2013.01); *H01R 2201/26* (2013.01)

(58) Field of Classification Search
    USPC .................................................... 439/110, 34
    See application file for complete search history.

(56) References Cited

U.S. PATENT DOCUMENTS

| | | | | |
|---|---|---|---|---|
| 7,462,063 | B1* | 12/2008 | Correll | H01R 9/2416 |
| | | | | 439/460 |
| 7,862,389 | B2* | 1/2011 | Pizzi | H01R 9/2633 |
| | | | | 439/715 |
| 8,206,164 | B2* | 6/2012 | Sprenger | H01R 9/2625 |
| | | | | 439/153 |
| 2007/0066101 | A1* | 3/2007 | Suzuki | B60R 16/0215 |
| | | | | 439/99 |
| 2007/0087620 | A1* | 4/2007 | Yamamoto | H02G 11/00 |
| | | | | 439/422 |

FOREIGN PATENT DOCUMENTS

| | | |
|---|---|---|
| DE | 196 26 390 A1 | 1/1997 |
| DE | 20 2013 104 784 U1 | 1/2014 |
| DE | 10 2016 000 059 A1 | 7/2017 |
| GB | 1 185 460 A | 3/1970 |

OTHER PUBLICATIONS

International Search Report, International Application No. PCT/EP2017/080741, dated Feb. 5, 2018, 15 pages.
Office Action in German Application No. 10 2016 123 036.7, dated Aug. 28, 2017, 10 pages.
Office Action in German Application No. 10 2016 123 036.7, dated Jan. 14, 2019, 8 pages.
Decision to Grant in German Application No. 10 2016 123 036.7, dated May 20, 2019, 10 pages.

* cited by examiner

ELECTRICAL LINE ARRANGEMENT WITH FLAT CONDUCTOR RAIL AND TOLERANCE COMPENSATION

CROSS-REFERENCE TO RELATED APPLICATION

This application is a national phase of International Application No. PCT/EP2017/080741, filed on Nov. 29, 2017, which claims priority to German Patent Application No. 10 2016 123 036.7, filed on Nov. 29, 2016. The contents of the above-referenced applications are expressly incorporated herein by reference to their entireties.

TECHNICAL FIELD

The present invention relates to an electric cable arrangement having a flat conductor rail, for a vehicle or for an on-board vehicle electrical system. The invention furthermore relates to a mounting rail and to a contact part housing for such a cable arrangement.

PRIOR ART

Electric cable arrangements having a flat conductor rail for use in an on-board electrical system of a vehicle are already known from the prior art.

For instance, German patent application 102016107080.7 of the present applicant, published after the filing date of the present application, describes a housing in which an electric cable, designed as a flat conductor rail, as well as a contact element contacting the flat conductor rail can be received. The housing has a cover and a housing base, which are connected pivotably to one another via a hinge. Thus, inside the housing, good, durable contacting of the flat conductor rail is possible.

A further cable arrangement having a flat conductor rail and a contact part housing attached to it is known for instance from the German patent application 102016116563.8 of the present applicant, also published after the filing date of the present application. In it, the contact part housing clasps the flat conductor rail from a lateral direction, relative to a longitudinal direction of the flat conductor rail, and is secured on the flat conductor rail in at least largely nonslip fashion.

This kind of flat conductor rail is essentially designed in massive or dimensionally stable form and thus in principle is a rigid system. Often, it is made from an aluminum material, which has a comparatively high coefficient of thermal expansion, and when used in the vehicle it is therefore subject to changes in its length. This makes it more difficult for a housing that is secured to the flat conductor rail to be secured to the vehicle, since the housing moves with the flat conductor rail, even though it is intended in particular to be fixed firmly on the vehicle by means of a screw connection.

DESCRIPTION OF THE INVENTION

One object of the invention, using the structurally simplest possible means, is therefore to compensate at least partially for a change in length of a flat conductor rail with a contact part housing secured on it.

The object is attained by the subjects of the independent claims. Advantageous refinements of the invention are disclosed in the dependent claims, the specification, and the accompanying drawings.

An electric cable arrangement of the invention for a vehicle has at last one essentially dimensionally stable flat conductor rail, formed for instance by a massive aluminum core, as well as at least one contact part housing made of plastic, which is secured on the flat conductor rail in such a way that it preferably at least partly clasps the flat conductor rail from a lateral direction relative to a longitudinal direction of the flat conductor rail. The contact part housing serves primarily to receive a contact part that contacts the flat conductor rail. The contact part that can be, or is, received in the contact part housing can be joined materially to the flat conductor rail, for instance by welding, and preferably has a connecting face for securing an electric cable, which contacts the flat conductor rail via the contact part. Securing the electric cable can be done for instance via a screw connection.

According to the invention, the cable arrangement furthermore has a mounting rail, preferably made of a plastic, on which at least one mounting flange for securing or connecting it to the vehicle is embodied. The mounting flange can for instance have one or more passage openings for a screw connection to the vehicle or a vehicle part or body part. Alternatively, under some circumstances, it would be possible to secure it using adhesive tapes, hook-and-loop tapes, or the like. The mounting rail further has at least one first connecting flange, by way of which the contact part housing is retained in interlocking fashion on the mounting rail in such a way that the contact part housing is movable along the mounting rail in translational or in other words linear fashion.

In other words, the mounting rail, as a tolerance-compensating intermediate component, is located between the vehicle (part) and the contact part housing secured on it. Since the flat conductor rail, because of its construction, primarily changes its length in the longitudinal direction, the contact part housing that is movable relative to it in translational fashion can "float" with it and thus can provide tolerance compensation with regard to the change of length caused by the coefficient of thermal expansion. Furthermore, because of its comparatively simple structural makeup, the mounting rail can easily be adapted to various embodiments of the contact part housing or of the vehicle (or vehicle part). If the mounting rail is installed in the vehicle before the flat conductor rail and/or the contact part housing is, then the mounting rail also serves if desired as an aid in assembly in the vehicle, so that the installer can orient himself to the mounting rail. However, it is also possible for the entire cable arrangement to be installed and introduced into the vehicle first, and then for the mounting rail to be secured to the vehicle (part) after that. Since the cable is preferably secured to the contact part via a screw connection, a screw torque acts here on the contact part and thus indirectly on the contact part housing, but this torque can be absorbed by the mounting rail.

In order for the cable arrangement to have a low installed height, so as to make it structurally simple to design, it is advantageous if the first connecting flange is located in a first plane adjacent to the mounting flange, in a direction perpendicular to the translational direction of motion. For instance, the mounting flange is embodied on the free longitudinal ends of the mounting rail, and the first connecting flange can then be located for instance between the two longitudinal ends. The contact part housing could then move translationally along with the flat conductor rail between the two longitudinal ends.

The cable arrangement can also have two or more flat conductor rails, which, to improve the electromagnetic compatibility (EMC), are located in layers with their flat sides toward one another. In such a cable arrangement, in order to be able to attach contact part housings of flat conductor rails located one above the other movably on a common mounting rail, the mounting rail can have a second connecting flange, which is located in a second plane, different from the first plane, in a direction that is perpendicular to the translational direction of motion. For instance, the second plane in this direction can be located above the first plane, in order to guide the contact part housing of a second flat conductor rail that is located above a first flat conductor rail.

For a simple structural makeup that nevertheless functions well, the first and/or second connecting flange can be embodied as a rail part of a linear guide, in particular a profile rail guide. The profile rail guide makes sliding guidance and interlocking possible, which keeps the contact part housing in the direction that is perpendicular to the translational direction. With regard to manufacture, this can be done by injection molding. Preferably, the contact part housing is slipped or threaded onto one of the free ends of the mounting rail. This can be done before or after the mounting rail is attached to the vehicle (part).

Preferably, the connecting flange can be embodied as a rail part of a dovetail guide. Thus especially stable interlocking can be achieved between the contact part housing and the mounting rail.

If the contact part housing clasps the flat conductor rail from a lateral direction, it is advantageous if the mounting rail is located essentially parallel to the longitudinal direction of the flat conductor rail. The longitudinal directions of the two rails are thus in this case the same.

The mounting rail can be used especially suitably if the contact part housing is fixed in essentially nonslip fashion on the flat conductor rail in the longitudinal direction of the flat conductor rail. This is because then, the contact part housing also moves along with the flat conductor rail in the event of a slight change of length, making it especially necessary to perform a longitudinal compensation.

To enable attaching the contact part housing directly to the mounting rail, a geometric engagement configuration can be embodied on the contact part housing for the sake of putting it into engagement with the connecting flange.

To make interlocking possible with a connecting flange embodied as a profile guide or dovetail guide, the geometric engagement configuration can embody a part of a profile rail guide or dovetail guide.

If the contact part housing is injection-molded from a plastic, the geometric engagement configuration can be shaped integrally with a housing part. This makes it especially economical to furnish the cable arrangement.

To keep the installation expense as low as possible even in a multilayer arrangement of flat conductor rails and/or when there are multiple contact part housings, multiple contact part housings can be retained on a single, common mounting rail. To do so, only a single mounting rail has to be secured to the vehicle (part), and then a plurality of contact part housings can be retained thereon.

The cable arrangement can be used especially advantageously if a plurality of flat conductor rails are located in layers relative to one another, and at least one contact part housing is secured on each layer and the contact part housings are retained on at least one single, common mounting rail. Thus despite higher functionality of the cable arrangement, the installation effort and expense are reduced to the minimum. If the connecting flange is embodied uniformly, it is possible to embody the contact part housings as identical parts, at least in terms of their geometric engagement configuration.

The invention also relates to a mounting rail for a cable arrangement in one or more of the variant embodiments described above.

Furthermore, the invention relates to a contact part housing for a cable arrangement in one or more of the variant embodiments described above.

BRIEF DESCRIPTION OF THE DRAWINGS

One advantageous exemplary embodiment of the invention will be described below with reference to the accompanying drawings. In the drawings.

The drawings are merely schematic illustrations and serve solely to explain the invention. Identical elements or elements that function identically are all provided with the same reference numerals.

DETAILED DESCRIPTION

Figure 1:
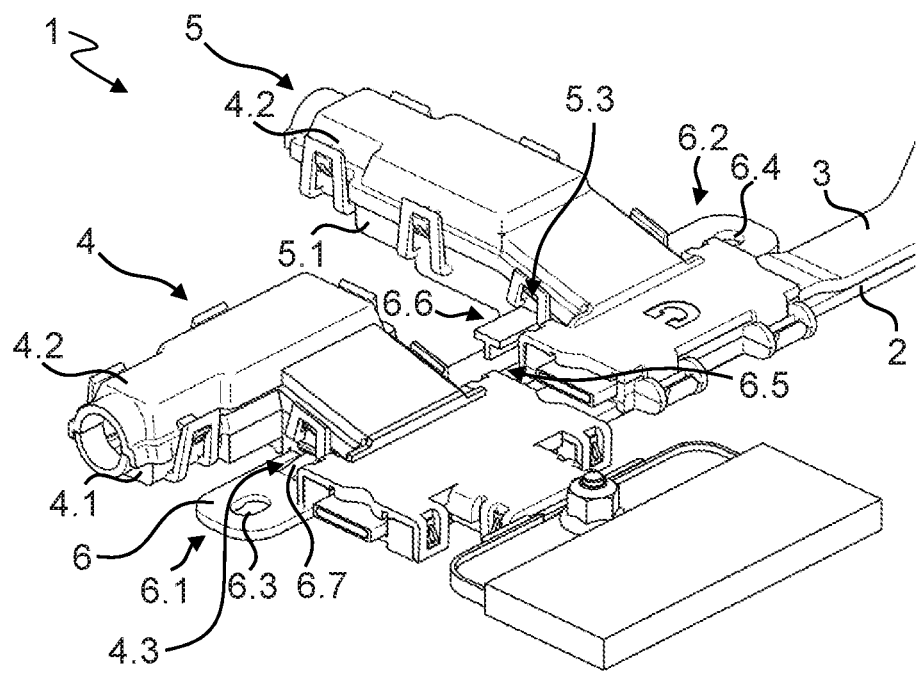
FIG. 1, in a perspective view, is a fragmentary section of a cable arrangement of the invention having two flat conductor rails and two contact part housings secured thereon, which contact part housings are retained on a common mounting rail.

In FIG. 1, in a perspective plan, a portion of an electric cable arrangement 1 is shown, which is suitable for use in an on-board electrical (energy) system of a vehicle. The cable arrangement 1 extends for instance along a longitudinal direction of the vehicle and serves there as a central energy supply system, which can handle a plurality of electrical loads, for instance between a front and a back portion of the vehicle.

For that purpose, the cable arrangement 1 here as an example has two dimensionally stable flat conductor rails 2, 3, located in layers relative to one another, which essentially have a solid aluminum core (not identified by reference numeral) as well as an insulation jacket of plastic (also not identified by reference numeral). Furthermore, the cable arrangement 1 here has two contact part housings 4, 5, for instance, each of which clasps (only) one of the flat conductor rails 2, 3 from a lateral direction as compared to the longitudinal direction of the flat conductor rails 2, 3. It is apparent in the section where the contact part housings 4, 5 are located, the flat conductor rails 2, 3 are spaced apart from one another in a direction that is perpendicular to their longitudinal direction, namely in a heightwise or widthwise direction of the cable arrangement. For that purpose, the flat conductor rail 3 (the upper one in the drawing) is offset in this direction. Thus in this direction, the contact part housings 4, 5 are also offset from one another relative to FIG. 1, or in other words are offset heightwise from one another.

Each contact part housing 4, 5, in particular for the sake of frictional connection, and thus nonslip clasping, of the flat conductor rails 2, 3, has both a base part 4.1, 5.1 and a respective housing cover 4.2, 5.2 linked to it in hingelike and thus lockable fashion; in the installed state these covers are located around the flat conductor rails 2, 3. In what in FIG.

1 is the covered interior of each of the contact part housings 4, 5, a respective contact part (not identified further by reference numeral) is received, which on the one hand is connected to the respective flat conductor rail 2, 3 and on the other is connected to a respective electric cable (not shown) guided into the contact part housing 4, 5, for instance via a screw connection. The electrical loads can be supplied by way of these cables.

In order to secure the contact part housings 4, 5 to the vehicle, or to a vehicle part or body part, such as a vehicle floor assembly, the cable arrangement 1 has a mounting rail 6 made of plastic. The contact part housings 4, 5 are in interlocking engagement with the mounting rail 6 in such a way that they are longitudinally movable along a longitudinal direction of the mounting rail 6, and thus can perform a translational motion relative thereto. The mounting rail 6 on each of its two longitudinal ends has a mounting flange 6.1, 6.2, which is formed essentially by a flat portion with passage openings 6.3, 6.4. The mounting flanges 6.1, 6.2 serve the purpose of securing to the vehicle or the vehicle part or body part by means of a screw connection. Extending between the mounting flanges 6.1, 6.2 are a first connecting flange 6.5, which enables an interlocking connection of the contact part housing 4 (the lower one in FIG. 1, that is, the one that is connected to the flat conductor rail 2), and a second connecting flange 6.6, which enables an interlocking connection with the contact part housing 5 (the upper contact part housing in FIG. 1, that is, the one that is connected to the flat conductor rail 3). The two connecting flanges 6.5, 6.6 are each embodied as a profile rail guide or a dovetail guide, so that the contact part housings 4, 5 are guided in sliding fashion thereon and are additionally retained both in the heightwise and widthwise direction as well as in a breadthwise direction of the mounting rail 6.

Figure 2:
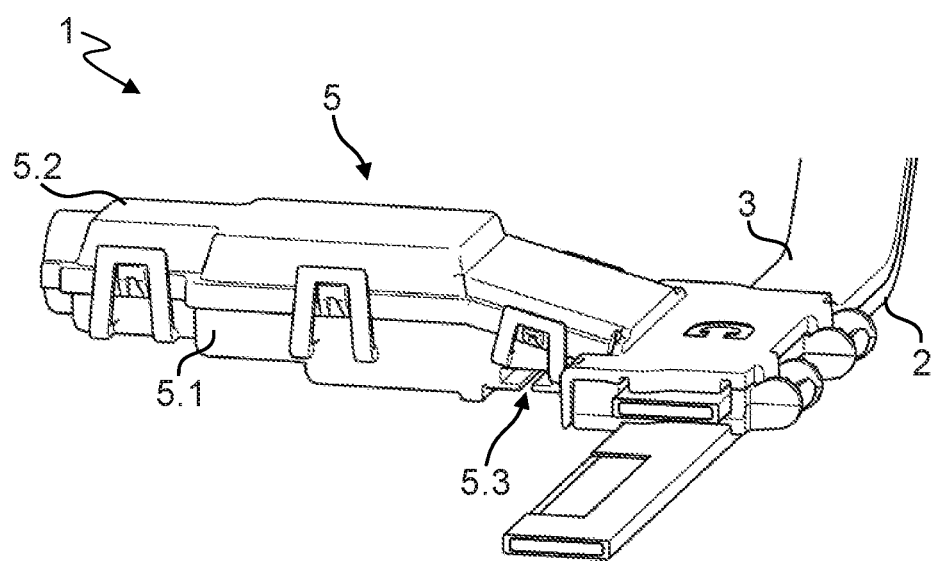
FIG. 2, in a perspective view, shows a cable arrangement of the invention in which for the sake of better clarity of illustration, a mounting rail is blanked out.

In FIG. 2, which for better illustration shows the cable arrangement 1 with only the contact part housing 5 as an example and with the mounting rail 6 blanked out, from the lateral direction, it can be seen that the contact part housings 4, 5 each have a geometric engagement configuration 4.3, 5.3 that is complementary to the respective connecting flange 6.5, 6.6 and is embodied in one piece with the contact part housing 4, 5. More precisely, the respective geometric engagement configuration 4.3, 5.3 is shaped in the respective base part 4.1, 5.1 and has a cavity (not identified by reference numeral) for passing through the respective connecting flange 6.5, 6.6. In the heightwise or widthwise direction of the contact part housing 4, 5, the cavity is formed between a base body of the base part 4.1, 5.1 and a first guide leg, spaced apart therefrom, and a parallel, second guide leg; for the sake of simplicity, these legs are not identified by reference numeral. The first and second guide legs are spaced apart from one another by a small gap in order to attain a slight flexibility. With the guide legs, the geometric engagement configurations 4.3, 5.3 thus clasp the profile rail guide and dovetail guide, respectively, and thereby establish an interlocking engagement, which nevertheless permits a translational motion along the longitudinal direction. Furthermore, it can be seen from the flat conductor rail 2 (the lower one, in FIG. 2) that in the vicinity of the contact part housings 4, 5, the insulating jacket is hollowed out so as to make an electrical contact with the contact parts in the interior of the contact part housings 4, 5.

Figure 3:
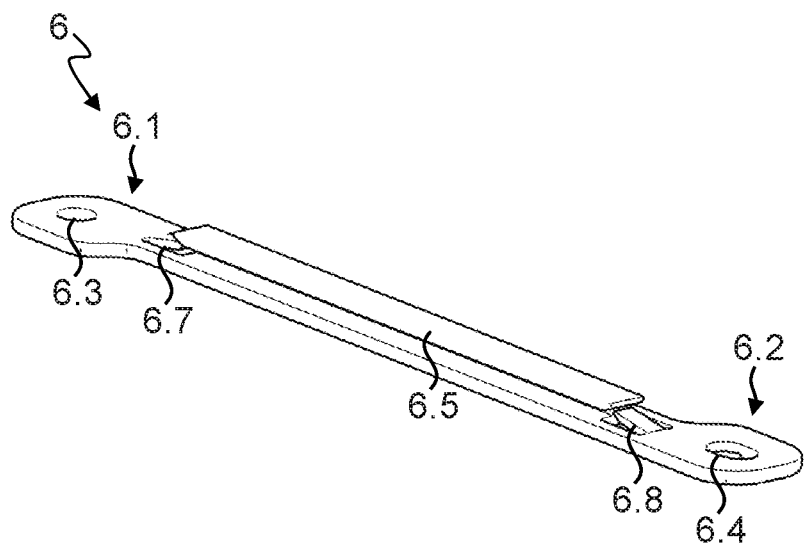
FIG. 3, in a perspective view, shows a mounting rail of the invention as a single component.

FIG. 3 shows an exemplary embodiment of the mounting rail 6 as an individual component. From this it can be seen that the (in this case sole, first) connecting flange 6.5, on its free ends that end toward the mounting flanges 6.1, 6.2, cooperates with a respective retention mechanism 6.7, 6.8, which prevents an unintended downward slide of the contact part housings 4, 5 by forming a terminal stop for the purpose. This retention mechanism 6.7, 6.8 is embodied here as a spring tongue, the free end of which runs obliquely to the respective free end of the connecting flange 6.5 and in this undeflected state is in a locked position, for the sake of retaining the contact part housings 4, 5. As a result, if the contact part housing 4, 5 is thrust as far as the longitudinal end of the respective connecting flange 6.5, it makes contact there; however, by deflection of the free end of the retention mechanism 6.7, 6.8, it can also be thrust into a securing position of the retention mechanism 6.7, 6.8 onto the connecting flange 6.5. After the free end of the retention mechanism 6.7, 6.8 is let loose, the free end springs back into its locking position and thus forms a stop for the contact part housing 4, 5 and retains it on the connecting flange 6.5 as a result.

Figure 4:
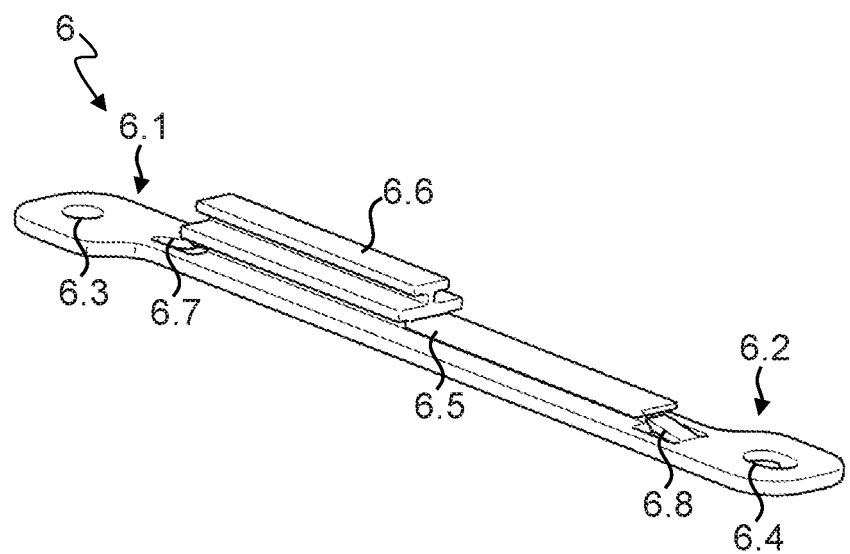
FIG. 4, in a perspective view, shows a further embodiment of a mounting rail of the invention as a single component.

In FIG. 4, a further embodiment of the mounting rail 6 is shown as an individual component. Now, in addition to the first connecting flange 6.5, this also has the second connecting flange 6.6, which is likewise located between the two mounting flanges 6.1, 6.2, but is located in a second plane, differing from the first plane, of the first connecting flange 6.5. With reference to the heightwise or widthwise direction of the mounting flange 6, the two connecting flanges 6.5, 6.6 are offset in height from one another, so that—as shown in FIG. 1—the two contact part housings 4, 5 can be secured such that they are offset in height from one another.

LIST OF REFERENCE NUMERALS

1 Electric cable arrangement
2 (First) flat conductor rail
3 (Second) flat conductor rail
4 (First) contact part housing
4.1 (First) base part
4.2 (First) housing cover
4.3 (First) geometric engagement configuration
5 (Second) contact part housing
5.1 (Second) base part
5.2 (Second) housing cover
5.3 (Second) geometric engagement configuration
6 Mounting rail
6.1 (First) mounting flange
6.2 (Second) mounting flange
6.3 (First) passage opening
6.4 (Second) passage opening
6.5 (First) connecting flange
6.6 (Second) connecting flange
6.7 (First) retention mechanism
6.8 (Second) retention mechanism

The invention claimed is:

1. An electric cable arrangement for a vehicle, comprising:
   a dimensionally-stable flat conductor rail;
   a contact part housing secured on the flat conductor rail and configured to receive an electrical part contacting the flat conductor rail, wherein the contact part housing clasps the flat conductor rail, and the contact part housing comprising a geometric engagement configuration passing through the contact part; and
   a mounting rail comprising a mounting flange for connection to the vehicle and a connecting flange configured to engage the geometric engagement and retain the contact part housing on the mounting rail such that the contact part housing is movable in a longitudinal direction along the mounting, wherein the connecting flange is located in a direction perpendicular to the longitudinal direction and adjacent to the mounting flange in a first plane.

2. The cable arrangement of claim 1, wherein:
the connecting flange is a first connecting flange; and
the mounting rail further comprises a second connecting flange, located in a second plane parallel to the first plane.

3. The cable arrangement of claim 2, wherein at least one of the first connecting flange or the second connecting flange is configured as a rail part of a profile rail guide.

4. The cable arrangement of claim 1, wherein the connecting flange is configured as a rail part of a dovetail guide.

5. The cable arrangement of claim 1, wherein the mounting rail is parallel to the longitudinal direction of the flat conductor rail.

6. The cable arrangement of claim 1, wherein the contact part housing is fixed to the flat conductor rail in the longitudinal direction of the flat conductor rail.

7. The cable arrangement of claim 1, wherein the contact part housing further comprises a geometric engagement section configured to engage with the connecting flange.

8. The cable arrangement of claim 7, wherein the geometric engagement section comprises at least part of a profile rail guide or dovetail guide.

9. The cable arrangement of claim 7, wherein a housing part comprises the geometric engagement.

10. The cable arrangement of claim 1, further comprising a plurality of contact part housings retained on the mounting rail.

11. The cable arrangement of claim 1, further comprising:
a plurality of flat conductor rails located in layered fashion relative to one another; and
a contact part housing secured on each flat conductor rail; wherein
the contact part housings are retained on the mounting rail.

12. A mounting rail comprising;
a mounting flange for connection to a vehicle; and
a connecting flange configured to engage a geometric engagement configuration passing through a contact part housing and retain the contact part housing on the mounting rail such that the contact part housing is movable in longitudinal direction along the mounting rail;
wherein:
the connecting flange is located in a direction perpendicular to the longitudinal direction and adjacent to the mounting flange in a first plane; and
the contact part housing is secured on a dimensionally-stable flat conductor rail and configured to receive an electrical part contacting the flat conductor rail, the contact part housing clasping the flat conductor rail.

13. A contact part housing secured on a dimensionally-stable flat conductor rail and configured to receive an electrical part contacting the flat conductor rail, wherein:
the contact part housing clasps the flat conductor rail; and
the contact part housing is configured to be retained on a mounting rail comprising:
a mounting flange for connection to a vehicle;
a geometric engagement configuration passing through the contact part;
and
a connecting flange configured to engage the geometric engagement configuration and retain the contact part housing on the mounting rail such that the contact part housing is movable in a longitudinal direction along the mounting rail, the connecting flange being located in a direction perpendicular to the longitudinal direction and adjacent to the mounting flange in a first plane.

* * * * *